A. J. ANDERSON.
INTERNAL COMBUSTION ENGINE.
APPLICATION FILED SEPT. 6, 1916.
1,212,875.
Patented Jan. 16, 1917.
2 SHEETS—SHEET 1.
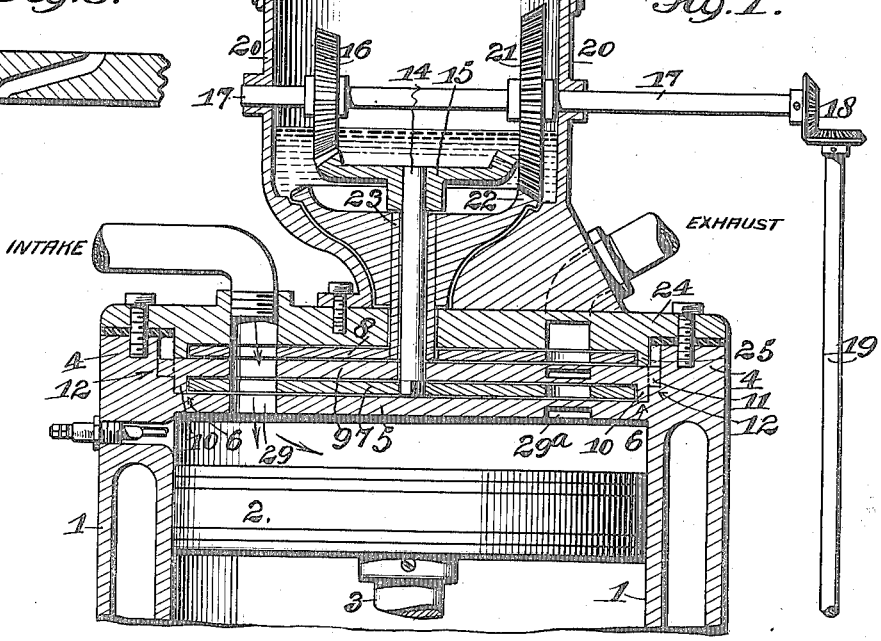
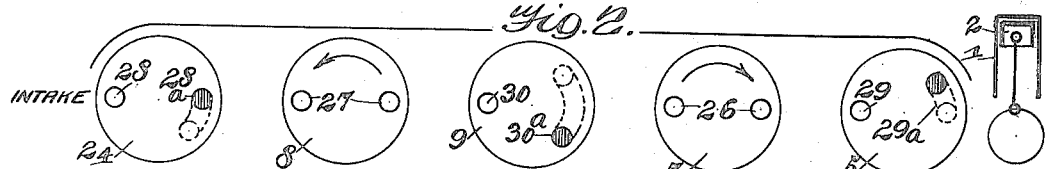
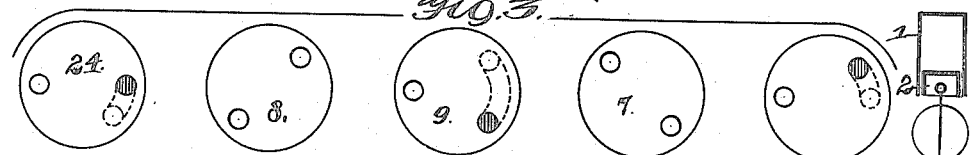
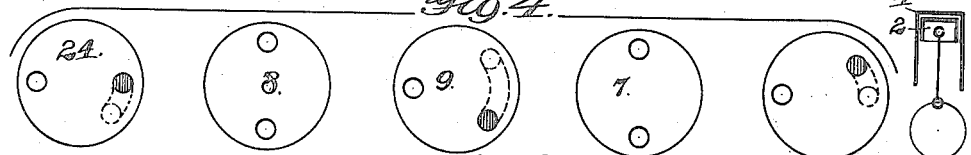
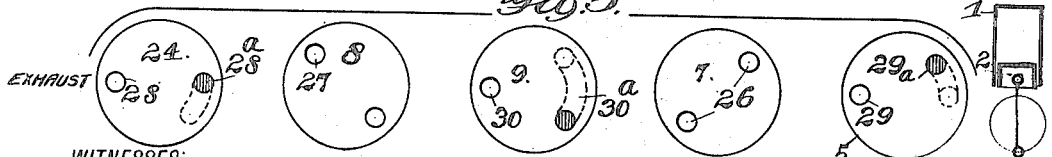
WITNESSES
E. M. Carraghan
John B. Schrott
INVENTOR
ANDERS J. ANDERSON,
BY Munn & Co
ATTORNEYS A. J. ANDERSON.
INTERNAL COMBUSTION ENGINE.
APPLICATION FILED SEPT. 6, 1916.
1,212,875.
Patented Jan. 16, 1917.
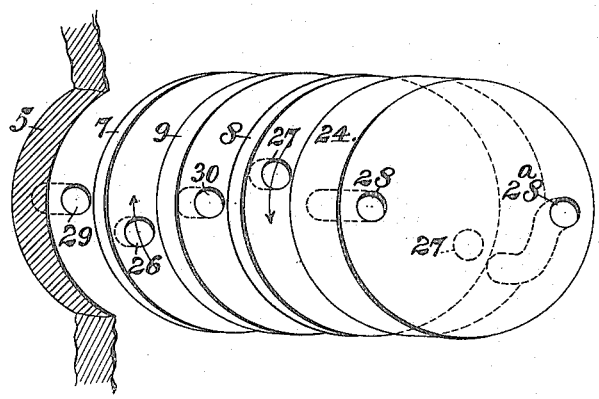
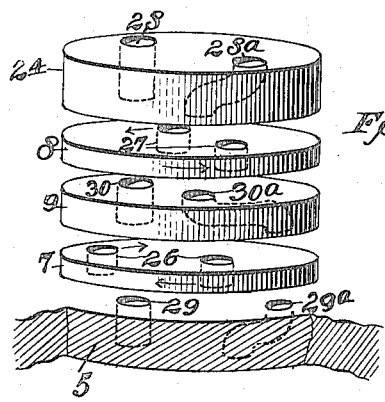
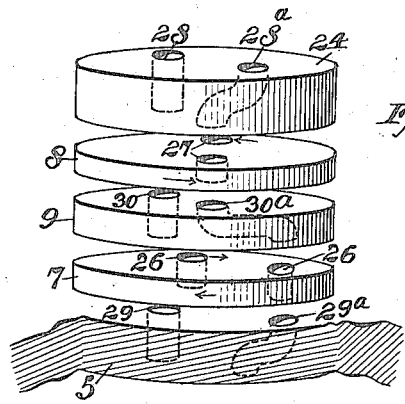
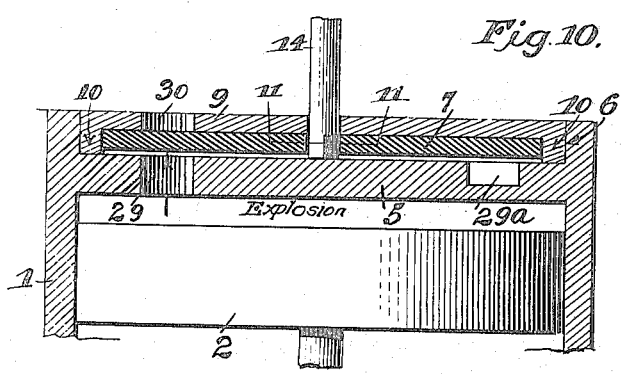
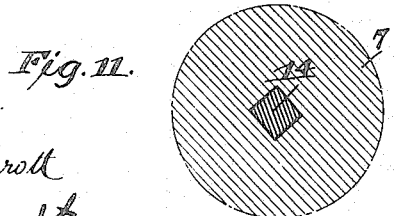
WITNESSES
INVENTOR
Anders J. Anderson
BY
ATTORNEYS

UNITED STATES PATENT OFFICE.

ANDERS J. ANDERSON, OF COLVILLE, WASHINGTON, ASSIGNOR OF ONE-HALF TO CHRISTIAN BORUP, OF COLVILLE, WASHINGTON.

INTERNAL-COMBUSTION ENGINE.

1,212,875.  Specification of Letters Patent.  Patented Jan. 16, 1917.

Application filed September 6, 1916. Serial No. 118,652.

*To all whom it may concern:*

Be it known that I, ANDERS J. ANDERSON, a citizen of the United States, and a resident of Colville, in the county of Stevens and State of Washington, have invented a new and useful Improvement in Internal-Combustion Engines, of which the following is a specification.

My invention relates to improvements in internal combustion engines and it consists in the combinations, constructions and arrangements herein described and claimed.

An object of my invention is to provide an internal combustion engine having a novel form of intake and exhaust valve which consists essentially of a pair of oppositely rotated plates separated by a partition, suitable ports being provided in the plates, partition and body of the engine cylinder to admit and allow the gases to escape as the piston moves on its strokes.

Another object of the invention is to provide the loose mounting of one of the plates on its driving shaft, to permit the plate to be urged against the adjacent partition when the gas is at the height of its compression and thus prevent leakage.

Another object of the invention lies in the positioning and formation of the various coöperating parts to form a gas tight chamber within the cylinder of the engine when the ports are out of alinement and when the gas tight chamber is mostly needed.

Other objects and advantages will appear from the following specification, reference being had to the accompanying drawings, forming a part thereof, in which—

Figure 1 is a vertical cross section of a portion of an engine embodying my invention, Figs. 2, 3, 4 and 5 are diagrammatic views illustrating the positions of the oppositely rotatable disks during one cycle of the operation of the engine, Fig. 6 is a detail cross section showing one of the exhaust ports, Fig. 7 is a perspective view illustrating diagrammatically the positions of the inlet ports in the movable disks when the piston is about to move on its induction stroke, Fig. 8 is a diagrammatic perspective view showing the relationship of the exhaust ports to the disks when they are in the position shown in Fig. 7, Fig. 9 is a diagrammatic perspective view showing certain of the openings in the disks as having moved into registration with the exhaust ports, Fig. 10 is a diagrammatic view illustrating the action of an exploding charge on the lower disk, Fig. 11 is a detail cross section on line 11—11 of Fig. 10.

By reference to Fig. 1, it will be seen that I employ the cylinder 1 of an internal combustion engine. Mounted within the cylinder 1 is a piston 2 which is joined by a suitable connecting rod 3 with the crank shaft (not shown) of the engine. The wall of the cylinder 1 extends upwardly as at 4 beyond the piston head 5 of the engine. An annular recess 6 is thus provided in which the elements of my invention are mounted as shown in Fig. 1.

The elements of my invention consist principally of a pair of disks 7 and 8 respectively. The disk 7 moves over the surface of the cylinder head 5 and is retained in place by a partition plate 9. The partition plate 9 has an annular flange 10 which is of a height slightly greater than the thickness of the disk 7, this provision admitting of a slight vertical movement of the disk 7 for a purpose presently to be explained. The flange 10, as will be seen in Fig. 1, encircles the disk 7, and the partition 9 may, if desired, be of hardened metal, so as to obviate undue wear. The partition 9 is also provided with laterally extending lugs 11 which set in suitable recesses 12 which prevent the relative turning of the partition 9. The disk 7 is provided with a central squared opening 13 in which the lower squared end of a drive shaft 14 is inserted. The squared end of the shaft 14 has slidable engagement with the squared aperture 13 so that the slight vertical movement, before referred to, of the disk 7, may be had. Mounted on the upper end of shaft 14 is a bevel gear 15 with which a driving pinion 16 meshes. The pinion 16 is mounted on a countershaft 17 which is driven by suitably intermeshing pinions 18 from a shaft 19 which in turn is driven by the crank shaft of the engine.

The countershaft 17 is supported in suitable bearings in a housing 20 which is disposed over the top of the engine. Mounted on the countershaft 17 and within the housing 20 is a second drive pinion 21. The pinion 21 meshes with a bevel gear 22 which is mounted on a sleeve 23 encircling the drive shaft 14 of the disk 7. Mounted on the lower end of the sleeve 23 and resting in engagement with the partition 9 is the second disk 8 before referred to. The disks 7 and 8, as well as the partition plate 9, are retained in their positions by a cover plate 24. The cover plate 24 has an annular flange 25 similar to the flange 10 of partition 9, and the flange 25 rests against the partition 9 and forms the boundary of a recess in which the upper disk 8 rotates.

It will be observed by reference to Fig. 1 that the housing 20 is bolted to the cover plate 24. By reason of the engagement of the drive pinions 16 and 21 with the bevel gears 15 and 22, the shaft 14 and sleeve 23 are consequently driven in opposite directions. Since the disks 7 and 8 are mounted on the lower ends of the shaft 14 and sleeve 23, it follows that these disks are rotated in opposite directions. It will also be observed that the housing 20 is provided with a suitable cover plate which may be removed for access to the gears within the housing, and to introduce a lubricant of sufficient density to lubricate the gears and prevent seepage through the bearing openings of the shaft 17.

It will be observed by reference to Figs. 2 and 8 that each of the disks 7 and 8 is provided with diametrically opposite openings 26 and 27 respectively. The cover plate 24 is provided with an inlet port 28 and an exhaust port 28$^a$, the port 28 extending directly through the cover plate. The entrance to the port 28$^a$ is positioned at a place to one side of a point diametrically opposite to the port 28, from whence it extends laterally and has its outlet at a place diametrically opposite to the port 28 as is also clearly seen in Fig. 9.

The cylinder head 5 is provided with an inlet port 29 which extends directly therethrough and is also provided with an exhaust port 29$^a$. The inlet to the port 29$^a$ is located at a point directly across from the port 29 from whence it extends laterally and in a direction similar to that of the port 28$^a$ of the cover plate 24 and thus has its outlet at one side of a medial line, as is clearly shown in Fig. 9.

The partition plate 9 is provided with an inlet port 30 which extends directly therethrough. The partition plate 9 is also provided with a laterally extending exhaust port 30$^a$ at a place opposite to the port 30, the entrance and outlet to the port 30$^a$ being at opposite sides of a medial line as indicated in Fig. 2. It will be observed in Fig. 7 that the ports 28, 30 and 29 of the cover plate 24, partition plate 9 and cylinder head 5, respectively, are in vertical alinement. Similarly the openings of the ports 28$^a$, 30$^a$ and 29$^a$ of the cover plate 24, partition 9 and cylinder head 5, respectively, are in alinement, since the openings of the disks 7 and 8 are positioned at diametrically opposite points and the openings to the ports in the cover plate, partition plate and cylinder head are offset from a medial line, it follows that when certain one of the openings in the disks 7 and 8 are in registration with inlet ports that the diametrically opposite openings in these disks are out of registration with the exhaust ports. This arrangement may be plainly seen in Fig. 8. It is also obvious that when certain of the openings of the disks 7 and 8 move into registration with the various exhaust ports in the cover plate, partition plate and cylinder head that the diametrically opposite positioned openings in these disks are out of registration with the inlet ports. This arrangement provides a means secure against the escape of the fresh or burnt gases around the juncture of the disks with their adjacent parts.

Having thus described the construction of my device, the operation is as follows:—
It will be seen from Figs. 2 to 5 inclusive, that I have illustrated a sufficient number of the stages of the piston 2 (at the right-hand side of each figure) to illustrate the positions of the disks 7 and 8 through one cycle of operation. In Fig. 2 the piston 2 is shown as beginning its induction stroke, while certain of the openings 26 and 27 of the disks 7 and 8 have moved into registration with the inlet ports 28, 30 and 29 of the cover plate, partition plate and cylinder head, respectively. The piston 2 now performs its induction stroke and a charge of fresh gas is drawn through the alining inlet ports and openings. While I have shown these ports and openings in alinement while the piston 2 is at the top of its stroke, the positions of the openings 27 and 26 of the disks 7 and 8 will actually be in the positions indicated in Fig. 7. It will be seen in Fig. 7 that the openings 26 and 27 of the disks 7 and 8 are approaching the ports 28, 30 and 29, this being the position of these openings when the piston commences its induction stroke. The disks 7 and 8 continue their rotation in opposite directions as indicated by the arrows, while the openings 26 and 27 continue to approach the inlet ports mentioned, forming an opening for the fresh gases of ever-increasing area until they move into full coincidence as shown in Fig. 2. Now as the disks 7 and 8 continue to rotate, the inlet ports are gradually closed, this action, as just described, occurring during the induction stroke of the piston 2, at the end of which the parts will be positioned substantially as shown in Fig. 3. The compression stroke of the piston 2 now takes place and when the piston is at the limit of its compression stroke, the charge is exploded, driving the piston outwardly. It will be seen by reference to Fig. 4 that at the time when the greatest pressures are generated within the cylinder 1, namely, when the piston reaches the limit of its compression stroke, as just described, that the openings 26 and 27 of the disks 7 and 8 are farthest from the ports in the cover plate, partition plate and cylinder head. It is at this time that the function of one of the essential features of the invention is exercised. It has been stated that the lower disk 7 is loosely mounted on the squared end of the drive shaft 14 and that the disk 7 is susceptible to a slight vertical movement. When the explosion now occurs within the cylinder 1 the pressure thereof forces the disk 7 tightly against the partition plate 9, as indicated in Fig. 10. Since the openings 26 and 27 are now remote from the coacting ports and since the disk 7 is tightly pressed against the partition plate 9, it is impossible for any leakage of the gases within the cylinder 1 to occur. The explosion having now occured, the piston 2 moves on its outward or power stroke, while the disks 7 and 8 continue to rotate in opposite directions. When the piston now performs the scavenging or return stroke, the openings 26 and 27 will have come into registration with the openings to the exhaust ports 28ª, 30ª and 29ª, as shown in Fig. 9. The burnt gases are now expelled through the continuous passage formed by the coinciding disk openings and exhaust ports. It will also be observed that the same openings 26 and 27 of the disks 7 and 8 which serve to induct the charge to the cylinder 1, now serve to educt the spent charge from the cylinder to the atmosphere. The opposite openings in the disks 7 and 8 remained idle during the operation just described, and have now approached the position shown in Fig. 7. When the piston 2 returns to the position shown in Fig. 5, the openings 27 which are described as having been idle, will move into registration with the inlet ports 28, 30 and 29, and the cycle of operation previously described will be repeated. I wish to lay particular emphasis on the peculiar offset arrangement of the exhaust ports 28ª, 30ª and 29ª, which in connection with the diametrically opposed locations of the openings in the disks 7 and 8 make it possible that a gas seal be formed during the induction stroke, since when certain of these openings are in alinement with the ports 28, etc., the opposite ones of these openings are in such positions as to be entirely out of communication with the exhaust ports as shown in Fig. 8. Conversely it is true that when certain of the openings in the disks 7 and 8 are in communication with the exhaust ports 28, etc., that the opposite openings in the disks 7 and 8 are out of alinement with the inlet ports 28, as indicated in Fig. 9.

Among the advantages of my invention I wish to particularly point out that there being a valve in the head of the cylinder, a waste of space is avoided. The matter of forming the gas tight seal as has already been pointed out, effects an economy in the amount of gas required which, when compressed, gives a much higher compression, utilizing every particle of gas.

While the showing and description is that of a preferred construction, it is obvious that various modifications may be made without departing from the spirit of the invention or the scope of the claims.

I claim:—

1. In an internal combustion engine, the combination of a cylinder head having ports, a superimposed partition plate having ports, a cover plate having ports, disks disposed between the cylinder head, partition plate and cover plate respectively, said disks having openings, and means for rotating the disks in opposite directions.

2. In an internal combustion engine, the combination of a cylinder head having ports, a superimposed partition plate having ports, a cover plate having ports, disks disposed between the cylinder head, partition plate and cover plate respectively, said disks having openings, and associated means for effecting the movement of the lower disk against the adjacent partition to form a gas seal.

3. In an internal combustion engine, the combination of a cylinder having a ported head, a piston in the cylinder adapted to perform a compression stroke, a partition plate having ports and an annular depending flange arranged to engage the cylinder head and forming a recess, a cover plate having ports, and an annular depending flange arranged to engage a partition plate and forming a recess, a disk having ports located in the recess between the cover and partition plates, a second disk having ports disposed in the recess between the partition plate and cylinder head, said disk being of lesser thickness than the depth of the recess, a sleeve for rotating the first-named disk in one direction, and a shaft extending through the sleeve and having a loose connection with the lower disk for rotating the disk in the opposite direction and for permitting the disk to move against the partition when the piston performs a compression stroke.

4. In an internal combustion engine, the combination of a cylinder having a ported cylinder head, the wall of the cylinder extending beyond the head to form a recess, a piston movable within the cylinder, a superimposed partition plate having an annular flange forming a recess, said partition plate having ports, a cover plate having ports, and an annular flange engaging the partition plate and forming a recess, a disk having openings disposed between the cover plate and the partition, a sleeve for rotating the disk, a second disk having openings and a central aperture, said disk being located between the partition plate and the cylinder head, said disk being of a lesser thickness than the depth of its recess, a shaft passing through the sleeve, and having a non-circular end for loose engagement with the lower disk for permitting the disk to move against the adjacent partition plate when the piston performs a compression stroke.

5. In an internal combustion engine, the combination of a cylinder having a cylinder head, a superimposed partition plate, a cover plate, the cover and partition plates and the cylinder head having alining exhaust ports and other laterally extending exhaust ports at opposite points, portions of these ports being in alinement, disks disposed between the cover, partition plates and cylinder head, said disks having openings at diametrically opposite points and means for rotating the disks in opposite directions.

ANDERS J. ANDERSON.

Witnesses:
L. M. McFARLAND,
C. M. LEDGERWOOD.